United States Patent [19]

Geerdes

[11] 3,846,523
[45] Nov. 5, 1974

[54] METHOD OF FORMING EXPANDED COMPOSITE MATERIALS IN THE ABSENCE OF RECOGNIZED BLOWING AGENTS

[75] Inventor: James D. Geerdes, Cheshire, Conn.
[73] Assignee: American Manufacturing Company, Inc., Brooklyn, N.Y.
[22] Filed: Dec. 12, 1967
[21] Appl. No.: 689,787

[52] U.S. Cl. ............... 264/41, 161/160, 161/161, 161/168, 260/2.5 E, 260/2.5 HA, 260/2.5 HB, 260/2.5 N, 260/2.5 P, 260/37 PC, 260/42.25, 260/42.43, 260/42.46, 260/42.47, 264/45, 264/51, 264/53, 264/176, 264/DIG. 5, 264/DIG. 13, 264/DIG. 16, 264/DIG. 17, 425/376
[51] Int. Cl. ............................................. B29d 27/00
[58] Field of Search ........... 264/41, 50, 51, 53, 323, 264/327, 328, 329, 176, 349, 102, DIG. 5, DIG. 13, DIG. 16, DIG. 17; 425/376; 161/168, 160, 161; 260/2.5 E, 2.5 HA, 2.5 HB, 2.5 P, 2.5 N, 37 PC, 41 R, 41 A, 41 C

[56] References Cited
UNITED STATES PATENTS

| | | | |
|---|---|---|---|
| 2,061,918 | 11/1936 | Nanfeldt | 264/349 X |
| 2,774,105 | 12/1956 | Bernhardt | 264/102 |
| 3,023,460 | 3/1962 | Hartman | 264/349 X |
| 3,036,335 | 5/1962 | Heston et al. | 264/102 |
| 3,078,511 | 2/1963 | Street | 264/349 X |
| 3,171,604 | 3/1965 | Conley et al. | 241/275 X |
| 3,184,428 | 5/1965 | Hecker et al. | 260/41 A |
| 3,211,689 | 10/1965 | Darby | 260/41 A X |
| 3,235,640 | 2/1966 | Carton et al. | 264/102 |
| 3,304,282 | 2/1967 | Cadus et al. | 264/349 X |

FOREIGN PATENTS OR APPLICATIONS

| | | | |
|---|---|---|---|
| 9,262 | 10/1933 | Australia | 264/176 |
| 12,850 | 4/1934 | Australia | 264/176 |

OTHER PUBLICATIONS

Fisher, E. G. "Extrusion of Plastics." New York, Interscience, c1958, pp. 80–81.
Penn, W. S. "PVC Technology." London, MacLaren, c1962, pp. 199–201, 221.
Ladoo, Raymond B. Nonmetallic Minerals, New York, McGraw-Hill, 1951, pp. 39–41; title page.
Kirk–Othmer Encyclopedia of Chemical Technology, Second Completely Revised Edition., Vol. 2, pp. 736; 740 and Vol. 5, pp. 402; 648.
Oleesky, Samuel S. SPI Handbook of Reinforced Plastics, New York, Reinhold, c1964, pp. 172, 173, 213, 214, 244–249.

*Primary Examiner*—Philip E. Anderson
*Attorney, Agent, or Firm*—Paris, Haskell & Levine

[57] ABSTRACT

The production of expanded polymeric materials is disclosed, wherein the expansion or foaming can be effected in the absence of recognized blowing agents. The results are accomplished by milling submicro particles of an inert filler and particles of a polymer under high impact and compression energy conditions. When the resultant composites are processed in a conventional foam generating manner, such as by extrusion, the composite expands to produce a foam having densities substantially less than a compression molded nonexpanded sample of the composite.

7 Claims, No Drawings

METHOD OF FORMING EXPANDED COMPOSITE MATERIALS IN THE ABSENCE OF RECOGNIZED BLOWING AGENTS

The present invention relates to expanded or foamed polymer compositions. Expanded polymer compositions are well known; they are commonly formed by incorporating a blowing agent in a body of polymer material. The blowing agent may be a gas releasing solid material, or a solid or liquid material that converts to a gas under the conditions of treatment. For example, a blowing agent may be mixed and dispersed in a polymeric molding powder. When this mixture is treated under a confining pressure so as to convert the blowing agent to a gas and the polymer to a plastic or viscous fluid stage, and the pressure is then released, the pockets of compressed gas formed by conversion of the blowing agent expand, causing an expansion of the mixture as a whole. The foamed polymer then is caused to solidfy in expanded state to provide the foamed structure.

This expanding or foaming operation may be accomplished in various environments to form shaped structure or simple masses of foam. One environment frequently employed is the extrusion of thermoplastic polymers. Here, thermoplastic resin molding pellets are mixed with a powdered blowing agent, and the mixture is fed under pressure from a hopper into an extrusion mold by a feed screw. The mold cavity is heated to a temperature above the melting point of the polymer and above the temperature at which the blowing agent converts to a gas. As this charge is fed by the screw from the hopper to the mold cavity, the molten charge is extruded under pressure from the cavity through an orifice in a die plate. As the molten material exits from the die orifice, the pressure on the material is suddenly released, and it expands before the resin sets. Continuous operation of the extruder will produce a continuous rod, ribbon or filament of foamed polymer whose crosssection shape is controlled by the shape of the die orifice. As is well understood in the art, the temperature at various stages of the extruder and at the die orifice are controlled to affect the foam properties, and secondary expansion dies may be located adjacent the extrusion orifice to control the degree of expansion of the extrudate, its cross-sectional size, and its crosssectional shape.

The blowing agents commonly utilized in the prior art processes are materials that are recognized as gas generators under the conditions of operation. In accordance with the present invention, however, it has been discovered that materials that are not recognized as gas generators, materials that are considered to be simply inert solids under the processing conditions employed, can nevertheless function to expand the polymer into a uniform, small pore, controlled foam product. The additives found most useful for the purposes of the present invention are those solids that are classified as brittle materials and which would normally be used as fillers for polymers. In this way the filler is utilized to perform two functions: one being to impart to the composite material the property for which the particular filler is normally used, and the other, to provide at the same time the foam generating property which is the subject of the present invention. For example, fillers are often added to polymers to change their opacity, density, color, luster, cost, strength, lubricity, etc. In accordance with the present invention, the usual fillers may be employed for these purposes, and at the same time utilized to generate a foam in the polymers.

The present invention utilizes the principles and discoveries described and claimed in the copending application of William L. Kuechler, S.N. 368,154, filed May 18, 1964 and now abandoned, entitled "Composite Materials," assigned to the same assignee as the present invention, and constitutes a further improvement thereover. Accordingly, said application is incorporated herein by reference. As set forth in said application, it was found that large percentages of solid particulate filler or additive materials can be incorporated in discontinuous phase in continuous phase polymeric matrices under conditions wherein the plastic qualities of the matrix polymer were retained, and in some instances even improved, despite the presence of as much as 75 percent or more filler. These results were obtained by milling together submicro particles of the filler with small particles of the polymer material. This milling operation was conducted under conditions to impart high impact energy substantially individually to the particulate components, and thereby uniformly disperse the submicro filler particles in substantially nonagglomerated state in the polymer particles, and to impart high compression forces to said particles incrementally to drive the individual filler particles into the polymer particles with very high localized compression forces. These results can be accomplished with high speed rotary impact mills, such as the type sold by Entoleter, Inc. under the trademark Centrimil, and which is generally shown and described in U.S. Pat. No. 3,171,604 issued to K. H. Conley, et al. The requisite high energy impact effect can be had by running said mill at a rotary speed which provides an impactor velocity of about 300 linear feet per second or greater; however, it is preferred for best results to use a rotary speed that provides an impactor velocity of at least about 600 linear feet per second. From studies of this milling process, it appears that impactor velocities about 300 feet per second impart sufficient impact energy to the system to disperse the submicro particles of filler into a substantially completely non-agglomerated condition and to cause the individual filler particles to be uniformly distributed over the surface area of the polymer particles. At impactor speeds of about 600 linear feet per second, or higher, the impact energy imparted to the system apparently causes the dispersed filler particles to be driven into and against the polymer particles with some type of interfacial reaction between the two materials, to form a composite of the two materials. In accordance with the present invention, it is found that particularly after the latter level of energy has been imparted to the system, the composite material can be caused to foam with a uniform and controlled expansion when treated in a manner conventionally used for generating foamed polymers by control of heat and pressure. This foam generation is obtained in the absence of any recognized blowing agent, although the foaming action of the inert filler can be supplemented by the addition to the composite of a conventional blowing agent. Despite the foam generation, the filler or additive material is still present in the composite material and performs the same function for which it would be normally used in the absence of the foaming aspect.

Expanded composites of the type described by this invention provide a valuable class of materials having wide application in most areas now utilizing extruded or molded plastic materials. The expanded composites hereinafter described extend the inherent utility of polymer materials and offer broader formulation potentials, exceptional composite uniformity, lower cost, and flexibility to tailor composite material properties to specific end-product requirements. Properties that can be uniquely modified and/or controlled include density, tenacity, elongation, flexural rigidity, elasticity, orientation (uni- and bi-axial), high and low temperature stability and distortion, hardness, electrical insulation, and transverse porosity gradient (e.g., skin/core).

The basic utility of such foamed products is obvious in many areas, such as in fibers, rope, cordage, films, laminated structures, insulation (e.g., as fabric liners, in building panels, as pipe covering, and as appliance jackets), wire covering, vibration dampeners, fibrids (e.g., for non-woven structures), packaging, and as a base material for blow molding, rotational molding and fluid bed coating.

For purposes of the present invention, the term "submicro" when applied to the particulate additive material is intended to denote a particle size of about 10 microns or less. The particle size of the particulate polymer material utilized in the high energy milling step of the present invention, is preferred to be in the range of about 250 microns or less, particularly in the range of a few tens of microns for most applications. The beneficial foam effects of the present invention are dependent in large part upon the use of submicro additive particles and the high energy process by which they are combined with the polymer; however, the particle size of the polymer is not critical. Nevertheless, to some extent the results obtained are dependent upon the relationship of polymer particle size to percent of additive included in the composite material, because of the need to provide an adequate surface area of polymer upon which to distribute the additive. Thus, the higher the percent of additive included in the composite, the smaller is the polymer particle size that is necessary to form the composite of the present invention.

It is therefore one object of the present invention to provide a foamed composite material having a continuous phase polymeric matrix with submicro additive particles incorporated therein.

Another object of the present invention is to provide a foamed composite material formed from a dispersion of substantially non-agglomerated submicro additive particles in a polymeric matrix.

Another object of the present invention is to provide for the foaming of a composite material formed from a dispersion of substantially non-agglomerated submicro additive particles in a polymeric matrix, without the need of a blowing agent additive.

Still another object of the present invention is to provide for said foaming of composite materials wherein the dispersion is formed by imparting high, localized, incremental impact and compression energy to said additive and polymeric materials.

And a still further object of the present invention is to provide for said foaming of composite materials wherein said energy is imparted to said additive and polymer materials by milling them together in a high energy rotary impact mill.

Other objects and advantages of the present invention will become apparent to those skilled in the art from a consideration of the following detailed description of the invention, and the specific examples therein set forth for illustrative purposes.

The composite materials utilized in the practice of the present invention as set forth in the following specific examples, were prepared by milling submicro additive or filler particles with particulate polymer in a rotary impact mill, of the general type illustrated in said U.S. Pat. No. 3,171,604. This milling was conducted under the preferred high energy condition of impactor linear velocity of about 600 feet per second, and the milling time was selected to afford a substantially complete compositing of the filler material into the polymer particles as ascertained by the absence of free filler particles in the product.

As suggested hereinabove, one conventional manner of producing foamed polymers is by extrusion. The polymer and blowing agent, when one is used, are fed under pressure into a mold cavity where the material is heated to melt the polymer and convert the blowing agent to a gas. The molten pressurized material is then extruded through a die orifice, and as it extrudes past the die opening, the pressure is suddenly relieved and the material expands, forming a foam. This general extrusion process was utilized in the examples hereinafter set forth utilizing a composited material milled as above described, to produce a controlled and uniform foamed extrudate. In most of the examples, the foamed or expanded extrudate was obtained without the use of any blowing agent, however, employing merely the composited polymer and inert filler.

In practicing the present invention, the composite material was extruded using a die comprising an outlet or orifice which was extended beyond the normal heated head and with control of the temperature of the extended section. For instance, polymer composites comprising solid particulate linear polypropylene and asbestos, combined in ratios of approximately 1 to 2, 1 to 1, and 2 to 1, were heated in a mold at conventional processing temperatures of about 375° to 450° F. and extruded at approximately this temperature, except that the extended orifice of the extrusion die was controlled at about 230° F. to 260° F. Uniform expanded products having specific gravities ranging from about 10 percent to 90 percent of unexpanded composites were produced. Extrusion through secondary expansion chambers was done in some cases to improve control of expansion and to generate desired extrusion shapes (e.g., round, flat, etc.). When the temperature of the extended die section was reduced to below about 220° F. to 230° F., a dense, smooth surfaced extrusion product was obtained, as might be expected from high pressure molding. When the temperature of the extended die section was held at conventional extruding temperatures, i.e., above about 260° F. and more particularly at about 375° F. to 450° F., a rough surface and undesirable discontinuities in the structure resulted. The discontinuities are believed to result from uncontrolled and non-uniform nucleation and expansion. The addition of other agents in the composite structure (e.g., surfactants) have been used to yield a smooth extruded product under "normal" processing conditions, but did not essentially alter the product and process requirements for desirable expansion. In some composites, additives were used to modify final product properties, such as light and heat stability, flexibility, hardness, and density. Although this invention does not require the addition of agents normally used to generate foam-producing gases, such agents can be used in conjunction with the basic composites to extend the utility and benefits of the final products.

The following specific examples are illustrative of the invention:

Example I 50 parts of linear polypropylene flake having a melt index of 2.0 at 230° C, (Hercule's Profax No. 6601) size reduced in an attrition mill to a size range of about 5 to 50 microns equivalent diameter, and 50 parts asbestos (Asbestos Corporation of America type AB6B) also size reduced in an attrition mill to about 0.5 to 10 microns equivalent diameter size range, were composited by high energy impact milling in a rotary impact mill as above-described, utilizing an impactor velocity of about 600 linear feet per second. The resultant composite was placed in a mold and heated to about 400° F. and extruded through a die having an orifice diameter of 0.0625 inch and a length of 0.75 inch, with the temperature of the die controlled at about 235° F. The pressure during the extrusion was about 5,000 psi. The extrudate expanded to a uniform foamed product about 0.155 inch in diameter. The expanded product density was 0.58 compared with an unexpanded compression molded composite density of 1.36 -- a 57 percent reduction in density. The compression molded specimens were produced in a cavity between the base charge and the extrusion orifice by sealing off the die and cooling the cavity while the composite was still under pressure. The measured density of the resulting structure (1.36) was essentially the same as the calculated theoretical value. In instances where the mold cavity was cooled to about 235° F. and the pressure suddenly released, internal expansion occurred yielding a foamed product having a fairly dense "skin."

Example II

The composite, extruder, and procedure used in this example was essentially the same as described in Example I, except that two parts of a conventional stabilizer were added to the polypropylene prior to size reduction to prevent degradation. The stabilizer was comprised of one part of di-stearyl thiodiproprionate (sold under the trademark "Distradap" by Carlisle Chemical Company) and one part of a substituted phenolic antioxidant having the trademark Mark 158 obtained from Argus Chemical Company. The combination was recommended for stabilizing polypropylene systems and is not considered to be a gas-generating agent for foaming or expanding polymers. The extrudate was a uniform foam having a specific gravity of 0.71, amounting to a 48 percent reduction in density over the unexpanded and compression molded composite.

Example III

This example differed from Example II only in the following manner: (a) the size reduced asbestos was heated in an oven at about 600° F. for at least three hours to eliminate any gas-generating agents which might be adsorbed in the particulate material; (b) ten parts of stearic acid (based on weight of asbestos) were mixed with the heat-treated particulate asbestos before cooling to below 400° F. The objective was to block potential sites for readsorption of gas-generating agents prior to molding and extrusion. The resultant composite when extruded as above, produced a uniform foam having a specific gravity of 0.85, a reduction of 37 percent from the density of 1.35 of a compression molded sample of the composite.

Example IV

In this example, conditions were essentially the same as in Example I, except the polypropylene was stabilized as defined in Example II, and 3 percent of epoxidized soybean oil was added (based on asbestos weight) to serve as a surface coupling agent and for possible plasticizer/stabilizer action. An excellent expanded product was obtained having a specific gravity of only 0.34, a 74 percent reduction in density from the density of 1.32 obtained with an unexpanded, compression molded sample of this composite.

Example V

The high energy impact milled composite of this example was formulated as described in Example IV, except that the material was further milled at 290° F. in a ball mill for two hours to achieve consolidation and increase the density of the final expanded product. Expanded specimens were made again essentially as described in Example I. The foamed extrudate had a specific gravity of 0.68, for a reduction of 48 percent relative to the compression molded composite density of 1.31. Comparing the results of Examples IV and V, it will be seen that the expanded extrudate density increased from about 25 percent to about 50 percent of unexpanded density, because of the physical action of ball milling.

Example VI

In this example, the ball milled composite as described in Example V was transferred to the extruder directly and rapidly following the hot ball mill treatment. An extrudate with a density substantially equal to that of a compression molded sample was obtained. The extruded product had a specific gravity of 1.24, for essentially no reduction in density relative to the compression molded density of 1.27. A comparison of Examples IV, V, and VI shows that ball milling can be utilized to control the degree of expansion of the extruded product.

Example VII

In this instance, a composite prepared essentially as described in Example I was used, except that prior to molding about three parts of water were added to the composite, and this material was placed in the extruder. The resulting extrudate exhibited the additive effect of the basic expandable properties of the composite and the gas generation which occurred from vaporization of the water at processing temperature, to produce a good, uniform expanded product having a specific gravity of 0.16, for an 87 percent reduction in density relative to the density of 1.27 for the compression molded product. By contrast, addition of water to polypropylene alone in a control experiment did not yield an acceptable foamed product, as would be expected from the prior experiences in the art.

Example VIII

The composite of this example was prepared and processed essentially as in Example I, except that only twenty-five parts of linear polypropylene were used with seventy-five parts of size reduced asbestos. Even at this very high concentration of additive ingredient, the density of the extruded product was about 20 percent less than the unexpanded material. A greater expansion action would have been obtained if the particle surface energy levels of the polymer and solid particulate materials were balanced for maximum reduction in surface energy level as they were combined, i.e., by use of still smaller sized polymer and solid particles.

Example IX

The composite for this example was prepared and processed essentially as in Example I, except that only twenty parts of size reduced particulate asbestos were used with 75 parts of linear polypropylene. Also, five parts of polytetrafluoroethylene (Teflon) were added prior to milling. Extrusion of this composite resulted in an expanded material having a specific gravity of 0.33, equal to a 67 percent density reduction over a density of 1.00 obtained with a compression molded sample. Also, the presence of the Teflon imparted low friction and excellent surface release properties to the specimens produced, illustrating the ability to further extend the utility of the invention to meet specific needs.

Example X

The composite for this example was prepared and extruded essentially as in Example I, except that 25 parts of submicro size anthracite material (a filler obtainable as "Anthrin filler" from Anthracite Industries, Sunbury, Pennsylvania, and size reduced to submicro particle size) were used in place of the asbestos. A very desirable expanded product was obtained having a specific gravity of 0.59, providing a 40 percent density reduction relative to the density of 0.98 obtained with a compression molded sample. The use of anthracite instead of asbestos as the additive or filler component required an adjustment in relative particle sizes (additive vs. polymer) compared to the asbestos system, indicating the desirability for control of surface parameters for optimum results. The anthracite was size reduced to about 5 microns and the polypropylene to about a 20 micron particle size.

The results of examples I-X are summarized in the following Table I.

TABLE I

| Example No. | Specific Gravity Values | | | Diameter of Expanded Structure (inches) |
|---|---|---|---|---|
| | Compression Molded Composite | Expanded Structure | % Reduction | |
| I | 1.36 | 0.58 | 57 | 0.155 |
| II | 1.37 | 0.71 | 48 | 0.130 |
| III | 1.35 | 0.85 | 37 | 0.122 |
| IV | 1.32 | 0.34 | 74 | 0.186 |
| V | 1.31 | 0.68 | 48 | 0.165 |
| VI | 1.27 | 1.24 | 2 | 0.140 |
| VII | 1.27 | 0.16 | 87 | 0.125 |
| VIII | 1.59 | 1.31 | 18 | 0.081 |
| IX | 1.00 | 0.33 | 67 | 0.144 |
| X | 0.98 | 0.59 | 40 | 0.143 |

Example XI

Polystyrene ("Styrone" from Dow Chemical Company) was size reduced by high energy milling to a particle size of about 70 microns average. An extruded sample of this base material had a density of 1.01, essentially the same as theoretical. Fifty parts of the size reduced polystyrene and 50 parts of size reduced asbestos (average particle size of about 2 microns) were impact milled together under high energy conditions as above-described, to form a composite of the two materials. The composite was then processed essentially as in Example I, except that molding temperatures were adjusted to accommodate to the lower molding temperature normally used for polystyrene. A uniform product was obtained having a density of 0.95, as against a theoretical density of 1.59 for the unexpanded composite.

A second test, run essentially as above but utilizing 25 parts of asbestos and 75 parts of polystyrene, also produced a uniform low density product with a density of 0.77, as against a theoretical density of 1.22 for the non-expanded composite.

Example XII

Polyvinyl chloride was size reduced to an average particle size of about 50 microns, and two parts of polydibutyl tin maleate stabilizer and ten parts of a conventional PVC plasticizer were added to fifty parts of the PVC. This polymer ingredient was then composited with asbestos having a size range of 0.5 to 10 microns by high energy impact milling as previously described. The composite was extruded as set forth in Example I. The resulting extruded product had a density of 1.14 compared to a theoretical density for the base composite of 1.73. The expansion responsible for the density reduction was caused to occur in only one cross-sectional dimension, i.e., without a significant concurrent increase in the orthogonal cross-sectional dimension. This result was obtained by providing the extrusion die with an expansion section which controlled the form of the expanded extrudate.

Example XIII

Polycarbonate polymer (obtained from General Electric Company) was size reduced to about 150 microns particle size by attrition milling. 25 parts of size reduced asbestos as set forth in Example I were composited with 75 parts of the size reduced polycarbonate and processed essentially as described in Example I. An extruded product was obtained with a density of 0.67 compared to a theoretical density of 1.41.

Example XIV

Samples A-J of composite material as used in Example IX above were extruded using a 1 inch hopper-fed screw extruder designed for extruding polyolefins. The temperature profile of the extruder was made close to that used in the extruder in Examples I to X above (i.e., above 400° F. feed temperature, 425° F. barrel temperature, 400° F. head temperature, and 240° F. die (orifice plate) temperature). The die face was fitted with a transition piece which permitted independent control of the die temperature. Die orifice dimensions included 1/16 inch, 1/8 inch and 1/4 inch diameter, 1/16 inch × 1/2 inch slot, and 1/8 inch × 3/4 inch slot. A secondary transition piece was also added during some of the tests to control expansion after extrusion and thus control and/or shape the expanded product to specific dimensions (e.g., from 1/8 inch die diameter to 1/4 inch expansion chamber). Temperature control of the expansion transition piece also permitted a wide range in the final product density and in the development of a "skin" effect surrounding a highly expanded core section. The wide variations that can be accomplished in products produced via these extrusion techniques are illustrated in Table II.

TABLE II

| Example XIV Sample No. | Composition- % Polymer/ Non-Polymer | Extrudate Dimension | Sample Density | | |
|---|---|---|---|---|---|
| | | | Unexpanded Composite (theoretical) | Expanded Extrudate (measured) | % Reduction |
| A | 75/25 | 5/16" Diam. | 1.07 | 0.76 | 29 |
| B | 50/50 | 5/16" Diam. | 1.33 | 0.93 | 30 |
| C | 75/25 | 11/16" Diam. | 1.07 | 0.25 | 77 |
| D | 75/25 | ⅜" Diam. | 1.07 | 0.66 | 38 |
| E | 75/25 | 7/16" Diam. | 1.07 | 0.53 | 50 |
| F | 75/25 | ½" Diam. | 1.07 | 0.40 | 63 |
| G | 50/50 | ⅞" Diam. | 1.33 | 0.93 | 30 |
| H | 75/25 | ¼" Diam. | 1.07 | 0.12 | 89 |
| I | 75/25 | ¾" × 1/16" | 1.07 | 0.30 | 72 |
| J | 50/50 | 1½" × ½" | 1.33 | 0.57 | 57 |

Example XV

In this example, Cab-O-Sil, a colloidal silica obtained from Cabot Corporation, was used as the additive filler material (about 0.05 micron size) and was composited as above-described with stabilized, size reduced polypropylene (average size about 40 microns). The composite was then processed essentially as in Example II. Seven composite samples A–G were prepared from these ingredients having different polymer to additive ratios, and the extrusion results are set forth in Table III. These results clearly show that for this system the amount of particulate additive should be held between about 15 and 25 weight percent to achieve a specific gravity reduction of over about 30 percent. The relation of surface area of polymer to concentration of additive is thus demonstrated as a control factor in achieving density reduction.

TABLE III

| Example XV % Polymer/Additive | Specific Gravity | | |
|---|---|---|---|
| | Unexpanded Composite (theoretical) | Expanded Extrudate (measured) | % Change |
| A 90/10 | 0.97 | 0.74 | 24 |
| B 85/15 | 1.01 | 0.78 | 30 |
| C 80/20 | 1.03 | 0.63 | 40 |
| D 75/25 | 1.08 | 0.82 | 28 |
| E 70/30 | 1.14 | 1.00 | 17 |
| F 60/40 | 1.20 | 1.04 | 15 |
| G 50/50 | 1.30 | 1.11 | 15 |

From the foregoing illustrative examples, it will be appreciated that the invention is applicable to many types of polymers, and is not limited to any particular polymer. Also, it is apparent that the particular filler used is not critical, and that any non-plastic material may be used, particularly those materials that are characterized as brittle substances, such as most solid minerals. The ratio of filler or additive to polymer may be varied widely, with the effect of changing the degree of expansion obtained; and in this respect, the size of additive particles and the size of polymer particles used to form the composite also affect the degree of expansion obtained. The degree of expansion to which the composite may be subject is also affected by mechanical treatment of the composite, such as ball milling, providing a further mode of control of the product produced. Various other additives, such as resin plasticisers and stabilizers, recognized gas generating materials, and numerous property modifiers may be utilized in the composite systems of the present invention for their conventional purposes, without materially affecting the polymer expansion properties of the invention. Accordingly, it is understood that the foregoing examples of the present invention are presented merely as illustrative thereof and to facilitate a complete understanding of the invention, and that numerous variations and modifications will be apparent to those skilled in the art. Such variations and modifications as are embraced by the spirit and scope of the appended claims are therefore contemplated as being within the purview of this invention.

What is claimed is:

1. A method of forming an expanded polymeric material comprising, milling together particles of a thermoplastic polymeric material and submicro particles of an additive material, both said materials being essentially non-volatile at a temperature at which said polymeric material is fluid, said milling being effected by a rotary impact mill having impactors traveling at a velocity of at least about 600 linear feet per second, to form a composite of said two materials, said composite consisting essentially of said two materials, confining said composite in a mold cavity under pressure and heating said composite to said temperature to render said polymeric material fluid, releasing said pressure while said polymeric material is fluid and permitting said composite to expand as a foam, and solidifying the foamed polymeric material with said additive particles retained therein.

2. A method as set forth in claim 1, wherein said polymeric material is selected from the group consisting of polypropylene, polystyrene, polyvinyl chloride, and polycarbonate polymers, and said additive material is selected from the group consisting of asbestos, teflon, anthracite, and colloidal silica.

3. A method as set forth in claim 1, wherein said pressure is released by extrusion of the fluid polymer composite out of said cavity through an orifice.

4. A method as set forth in claim 1, wherein said additive material is composed primarily of a brittle material.

5. A method as set forth in claim 1, wherein said composite is ball-milled before introduction into said mold cavity.

6. A method as set forth in claim 1, wherein the particle size of said polymeric particles is less than about 250 microns.

7. A method as set forth in claim 1, wherein the particle size of said polymeric particles is less than about a few tens of microns.

* * * * *